United States Patent
Abe

(10) Patent No.: US 8,331,350 B2
(45) Date of Patent: Dec. 11, 2012

(54) IP TELEPHONE AUTO CONFIGURATION SYSTEM AND METHOD

(75) Inventor: Kentarou Abe, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 1682 days.

(21) Appl. No.: 11/442,269

(22) Filed: May 30, 2006

(65) Prior Publication Data

US 2006/0271665 A1    Nov. 30, 2006

(30) Foreign Application Priority Data

May 31, 2005    (JP) ................. 2005-159489

(51) Int. Cl.
*H04L 12/66* (2006.01)
*H04L 29/06* (2006.01)

(52) U.S. Cl. .............. 370/352; 370/392; 370/401

(58) Field of Classification Search .......... 370/401, 370/352
See application file for complete search history.

(56) References Cited

U.S. PATENT DOCUMENTS

| 7,411,915 | B1* | 8/2008 | Spain et al. ............ 370/250 |
| 2002/0159463 | A1* | 10/2002 | Wang ...................... 370/401 |
| 2003/0156579 | A1* | 8/2003 | Cho ........................ 370/352 |
| 2004/0081104 | A1* | 4/2004 | Pan et al. ................ 370/254 |
| 2005/0111455 | A1* | 5/2005 | Nozue et al. ............. 370/392 |
| 2006/0050688 | A1* | 3/2006 | Panagopoulos et al. .. 370/356 |

FOREIGN PATENT DOCUMENTS

| JP | 03-181260 | 8/1991 |
| JP | 2001-203806 A | 7/2001 |
| JP | 2004-135147 A | 4/2004 |
| JP | 2004-166263 A | 6/2004 |
| JP | 2005-107851 A | 4/2005 |
| JP | 2005-117458 A | 4/2005 |

* cited by examiner

*Primary Examiner* — Asad Nawaz
*Assistant Examiner* — Jason Harley
(74) *Attorney, Agent, or Firm* — Foley & Lardner LLP

(57) ABSTRACT

To provide An IP telephone auto configuration system capable of conducting setting and change work of IP telephones connected to a LAN efficiently and accurately. The IP telephone auto configuration system includes IP phones, a DHCP server for assigning IP addresses to the IP phones, an FTP server for storing setting data of the IP phones, and a network for connecting the IP phones, the DHCP server and the FTP server. Each of the IP phones acquires an address of the FTP server and a file name of setting data from the DHCP server after being started, acquires setting data from the FTP server and automatically conducts detailed setting in the IP phone.

4 Claims, 13 Drawing Sheets

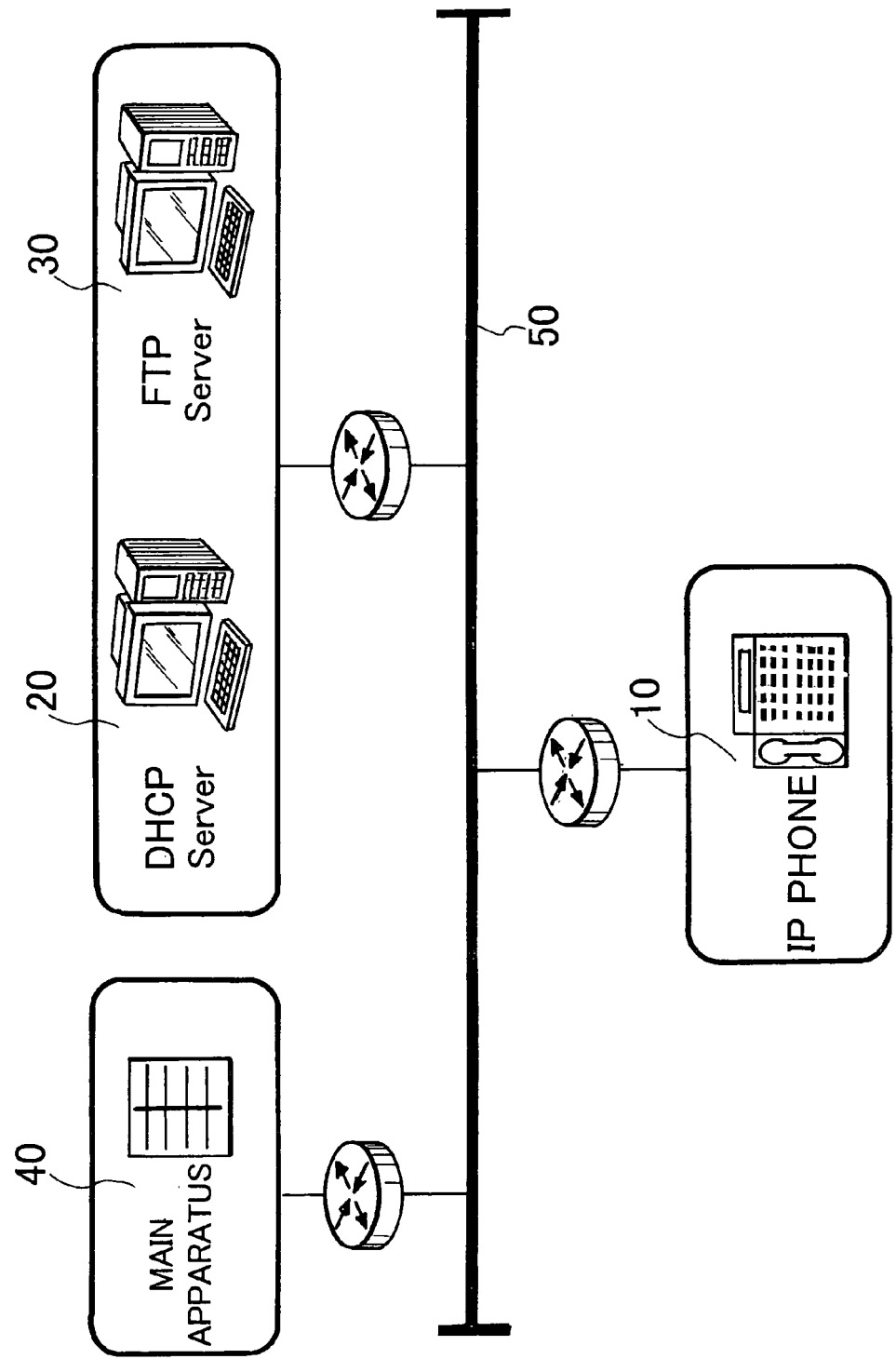

FIG.2

DHCP Option ID

| Option ID | CONTENTS |
|---|---|
| 001 | Subnet Mask |
| 003 | Default Gateway Address(Router Address) |
| 006 | DNS Server Address |
| 015 | DNS DOMAIN NAME |
| 161 | MAIN APPARATUS ADDRESS |
| 141 | FTP Server Address |
| 151 | DETAILED DATA FILE NAME |

FIG.3

DETAILED DATA FILE

| SETTING ITEM | CONTENTS |
|---|---|
| Cnf Data Ver | FILE VERSION |
| DHCP | DHCP MODE SETTING |
| VLAN Mode | VLAN MODE SETTING |
| VLAN ID | VLAN ID SETTING |
| VLAN Priority | VLAN PRIORITY SETTING |
| Speed & Duplex | LAN SPEED & DUPLEX SETTING |
| Port | PORT SETTING |
| Auto Config Mode | AUTO CONFIGURATION USE SETTING |
| Check Sum | CHECK SUM OF CONFIGURATION DATA |

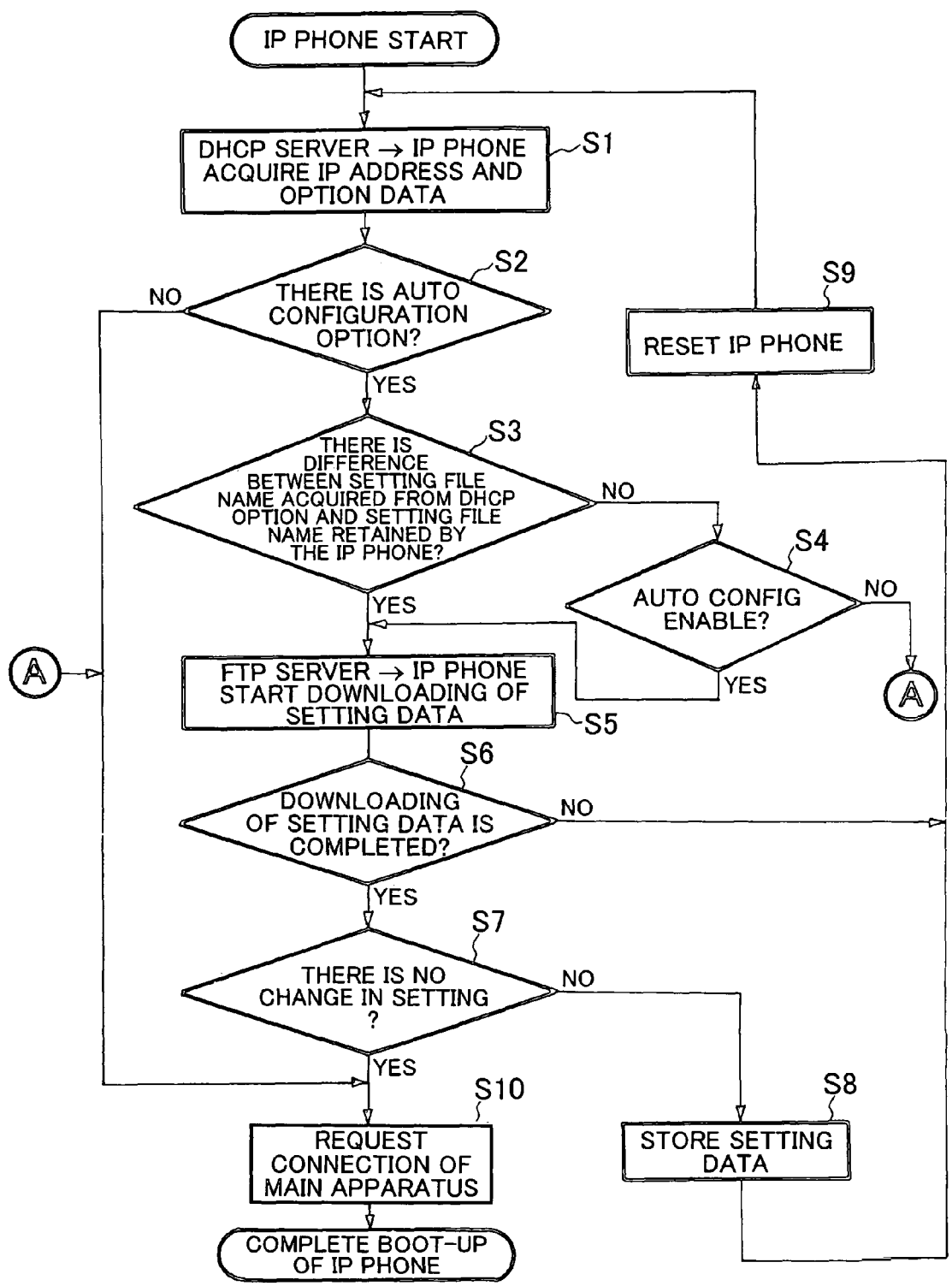

ORDINARY SEQUENCE

INTRODUCTION OF 1,000 IP PHONES
100 IP PHONES: SETTING CONDITION A
400 IP PHONES: SETTING CONDITION B
500 IP PHONES: SETTING CONDITION C

SETTING CONDITION A
VLAN:Enable
VLAN ID:20

SETTING CONDITION B
Port:5434
LAN Speed:100M

SETTING CONDITION C
LAN Speed:10M
Duplex:Full

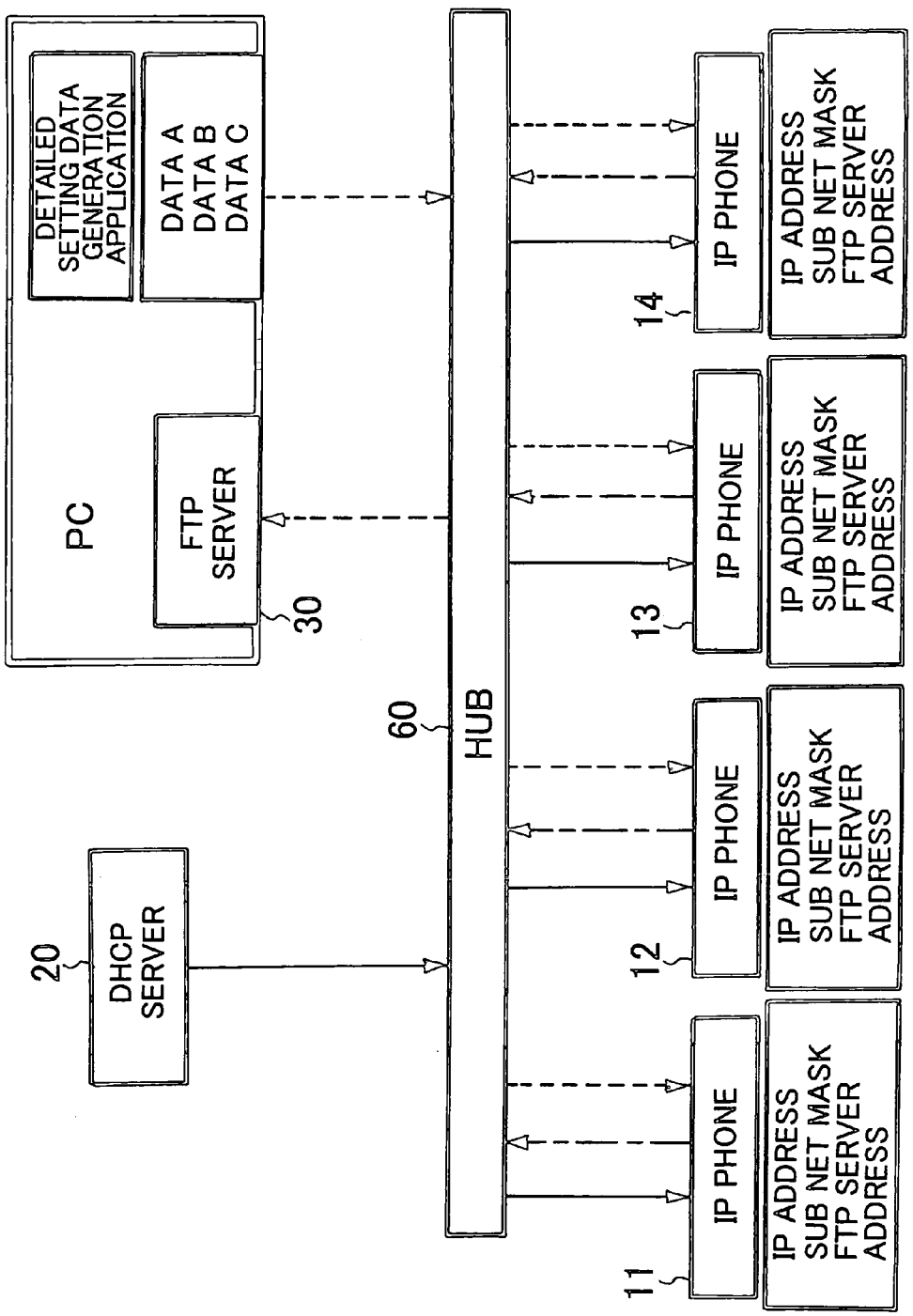

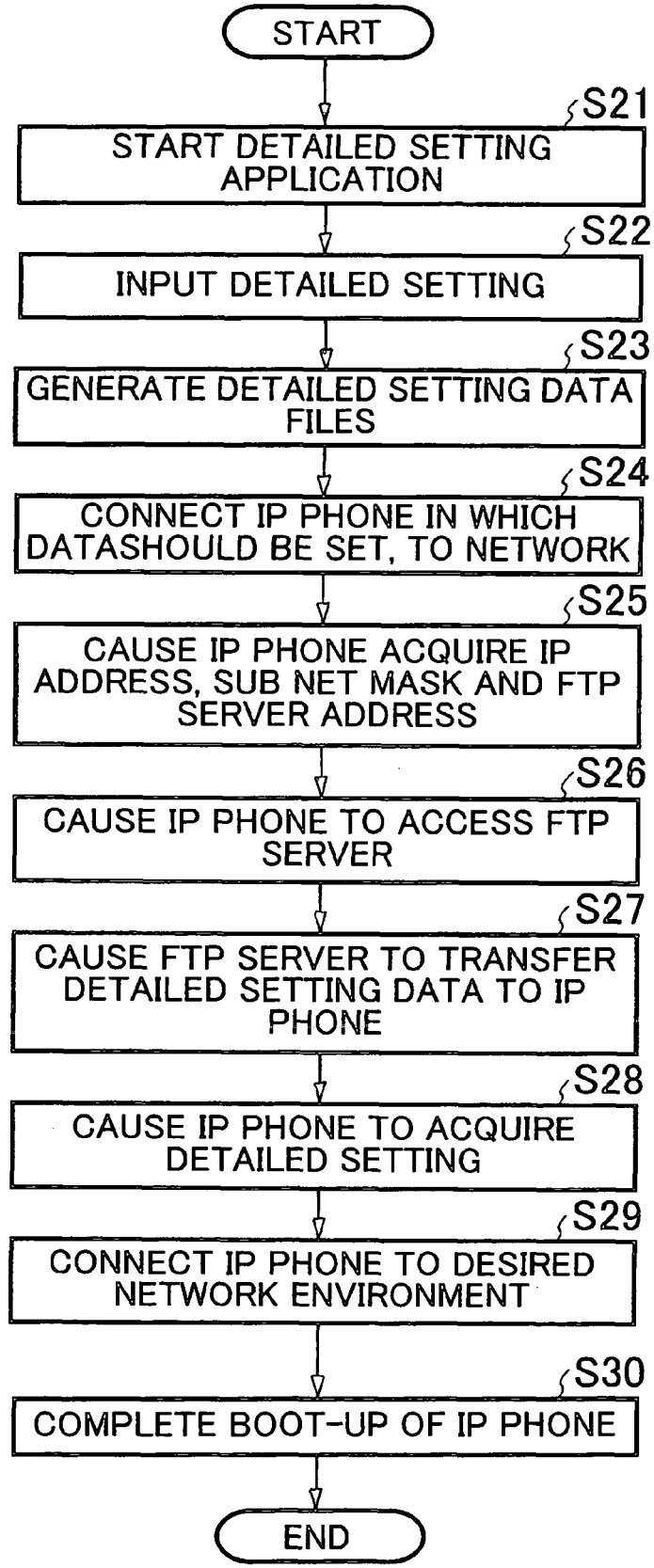

IP TELEPHONE AUTO CONFIGURATION SYSTEM AND METHOD

BACKGROUND OF THE INVENTION

1. Field of the Invention

The present invention relates to an IP telephone auto configuration system for automatically conducting detailed setting in IP (Internet Protocol) telephones connected to a LAN (Local Area Network).

2. Description of the Related Art

According to the conventional technique, detailed setting in each IP telephone is conducted manually according to LAN environment at the time of new introduction of IP telephones. And setting in each IP telephone is changed in maintenance work.

Furthermore, there is an initial setting method for executing initial setting operation in a cable modem. According to the method, the cable modem requests a DHCP (Dynamic Host Configuration Protocol) server to assign an IP address, acquires a file name of a file having an address of a TFTP (Trivial File Transfer Protocol) server and setting information recorded therein, downloads the file from the TFTP server, and conducts setting (for example, see JP-A-2004-135147).

If the number of introduced IP telephones is small, setting and change work are not enormous. When conducting setting and change work of more than one thousand IP telephones, however, the burden of time and expense becomes very heavy.

SUMMARY OF THE INVENTION

Therefore, an object of the present invention is to provide an IP telephone auto configuration system, and method, in which setting and change work of IP telephones connected to the LAN can be conducted efficiently and accurately.

In order to solve the problem, the present invention provides an IP phone auto configuration system including IP phones, a DHCP server for assigning IP addresses to the IP phones, an FTP server for storing setting data of the IP phones, and a network for connecting them, wherein each of the IP phones includes means for acquiring an address of the FTP server and a file name of setting data from the DHCP server after being started, and means for acquiring setting data from the FTP server and automatically conducting detailed setting in the IP phone.

Owing to the configuration above described, detailed setting in IP telephones connected to the network can be conducted automatically.

When conducting setting in a plurality of IP telephones, it is possible according to the present invention to conduct auto configuration by only connecting the IP telephones to a network environment having an IP telephone auto configuration system via a LAN cable. As a result, it becomes possible to shorten the time and reduce the personnel expenses.

BRIEF DESCRIPTION OF THE DRAWINGS

FIG. 1 is a system configuration diagram according to the present invention;

FIG. 2 is a diagram showing details of a DHCP option ID;

FIG. 3 is a diagram showing details of a setting data file;

FIG. 4 is a flow chart showing operation of an IP telephone auto configuration system according to the present invention;

FIG. 14 is a diagram showing a network connection example according to the present invention; and FIG. 15 is a flow chart in the case where the present invention is applied to an IP telephone system in a building.

DESCRIPTION OF THE PREFERRED EMBODIMENTS

Embodiments of the present invention will now be described with reference to the drawings.

FIG. 1 shows a system configuration according to the present invention. An IP telephone (IP phone) 10, a DHCP server 20, an FTP server 30, and a main apparatus 40 are connected to a network 50. In response to an IP address request from an IP phone, the DHCP server 20 dynamically assigns an IP address, and notifies the IP phone of the FTP server. The FTP server 30 has a detailed setting data file of IP phones. The main apparatus 40 accommodates a plurality of IP extension terminals and conducts exchange with an external line.

FIG. 2 shows details of the DHCP option ID. An address of the main apparatus, an address of the FTP server, and a detailed data file name are set in the DHCP option ID. As for the detailed data file name, the same file name is set in both a scope A (VLAN: Disable) and a scope B (VLAN: Enable) which are ranges of the IP address used by the DHCP server. Upon receiving an IP address request from an IP phone, the DHCP server adds an option ID to an IP address of the requested IP phone, and sends a notice thereof.

FIG. 3 shows details of a setting data file of IP phones stored in the FTP server. In an FTP server specified by the option ID notified of by the DHCP server, detailed setting data of IP phones are stored with a specified file name. As for "Auto Configuration Mode" in setting items, Enable/Disable of the automatic configuration function of an IP phone is set.

FIG. 4 is a flow chart showing operation of an IP phone auto configuration system according to the present invention. After start of an IP phone, the IP phone acquires an IP address and option data from the DHCP server (S1). If there is option data for auto configuration (Yes at S2), then it is determined whether there is a difference between the setting file name acquired from a DHCP option and a setting file name retained by the IP phone (S3). If there is a difference (Yes at S3), downloading of setting data from the FTP server to the IP phone is started (S5). If downloading of setting data is completed (Yes at S6) and there is no change in setting data (Yes at S7), then the IP phone is connected to the main apparatus (S10) and initialization of the IP phone is completed. If the decision at the step S2 is "No", then the IP phone is connected to the main apparatus (S10). If the decision at the step S3 is "No" and the auto configuration function is "Enable" (Yes at S4), then the processing proceeds to step S5. If the auto configuration function is "Disable", then the processing proceeds to step S10. If the decision at the step S6 is "No", then the IP phone is reset (S9) and the processing returns to the step 1. If the decision at the step S7 is "No", then the setting data is stored (S8) and the IP phone is reset (S9), the processing returning to the step 1.

Figure 5:
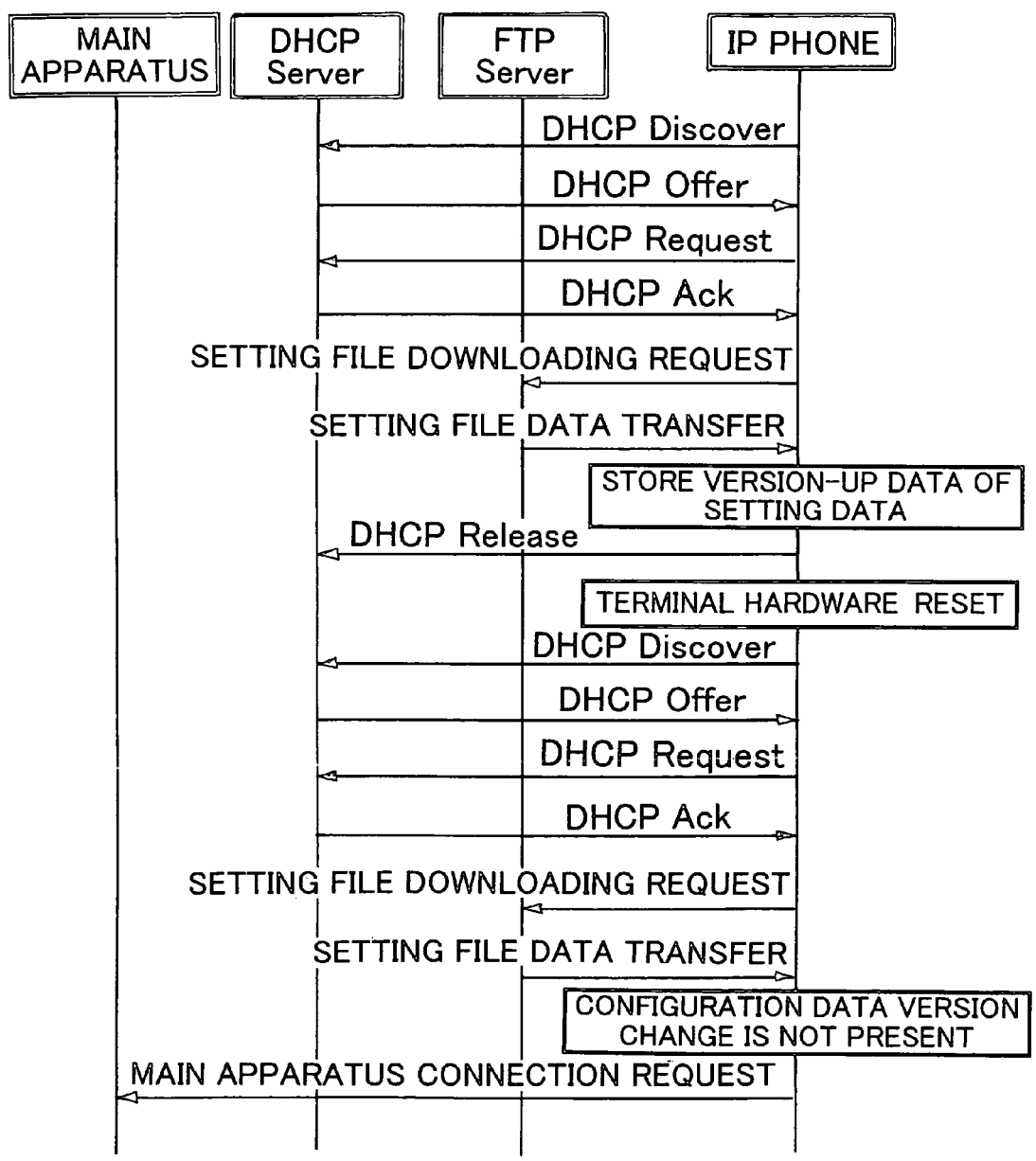
FIG. 5 is an auto configuration sequence diagram of an IP telephone using an auto configuration function.

FIG. 5 is a sequence diagram showing operation conducted until the IP phone is connected to the main apparatus by using the auto configuration function according to the present invention. The IP phone transmits DHCP Discover to the DHCP server. Upon receiving the DHCP Discover, the DHCP server assigns an IP address to the IP phone by using DHCP Offer, and transmits DHCP option data shown in FIG. 2. Upon receiving the DHCP option data, the IP phone transmits DHCP Request. The DHCP server returns DHCP Ack.

The IP phone requests an FTP server having an IP address obtained from the DHCP option data to download the detailed setting data file. The FTP server transmits the detailed setting data file. Upon receiving the detailed setting data file, the IP phone conducts version upgrade on the setting data and stores resultant setting data. And the IP phone transmits DHCP Release and resets itself in a hardware manner.

Subsequently, the IP phone repeats the operation from the DHCP Discover transmission to the detailed setting data file reception. If there is not a change in the set data, the IP phone transmits a connection request to the main apparatus.

Figure 6:
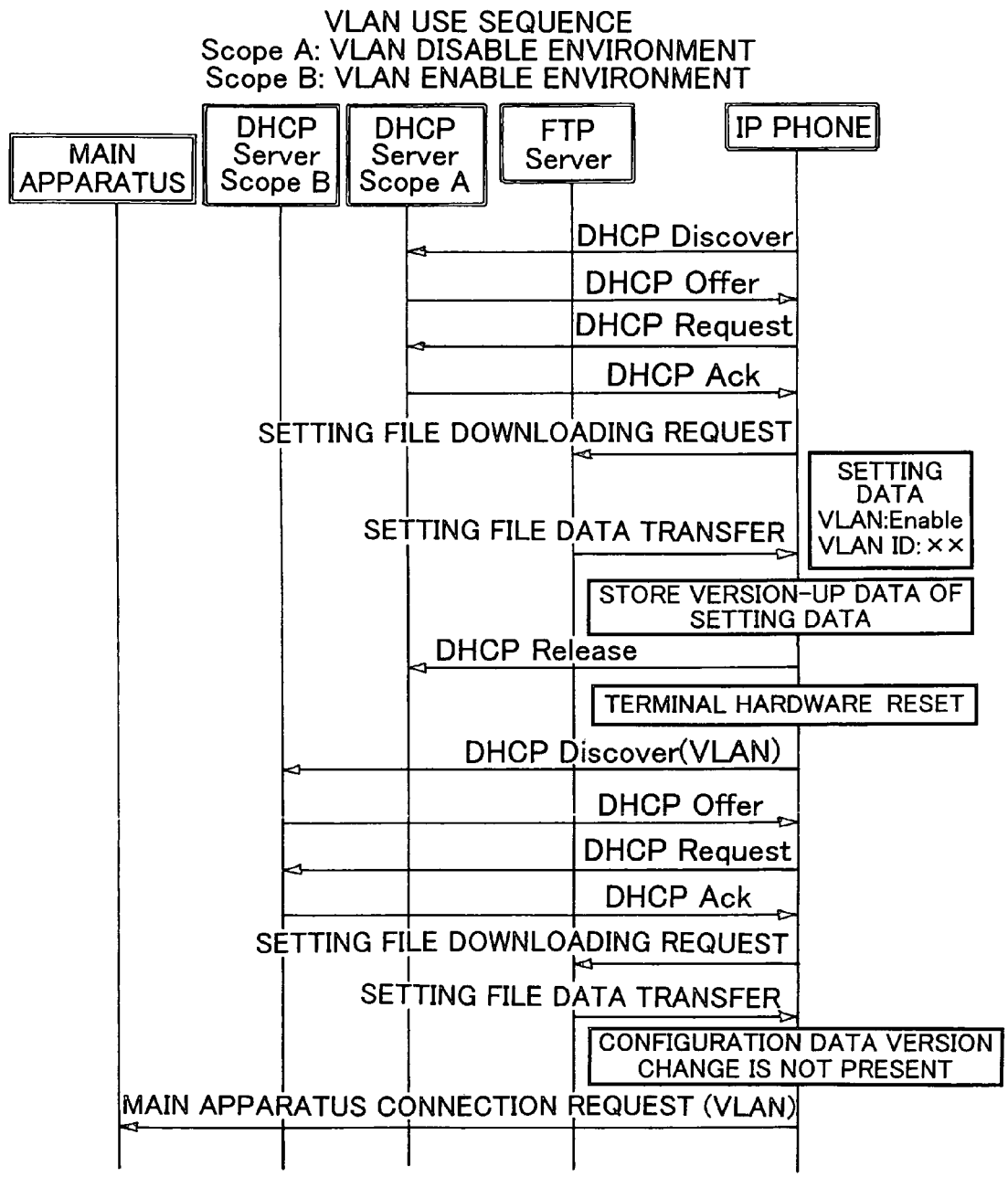
FIG. 6 is an auto configuration sequence diagram of an IP telephone in a VLAN environment.

FIG. 6 shows the case where a VLAN (Virtual LAN) is used in a LAN environment in which the IP phone is connected. In a scope A, the VLAN is disabled. In a scope B, the VLAN is enabled. The IP phone transmits DHCP Discover to the scope A in the DHCP server. Upon receiving the DHCP Discover, the DHCP server assigns an IP address to the IP phone by using DHC Offer, and transmits DHCP option data. Upon receiving the DHCP option data, the IP phone transmits DHCP Request. The DHCP server returns DHCP Ack.

The IP phone requests an FTP server having an IP address obtained from the DHCP option data to download the detailed setting data file. The FTP server transmits the detailed setting data file. The detailed setting data file has a specification "VLAN: Enable, VLAN ID: XX". Upon receiving the detailed setting data file, the IP phone conducts version upgrade on the setting data and stores resultant setting data. And the IP phone transmits DHCP Release and resets itself in a hardware manner.

Subsequently, the IP phone repeats the operation from the transmission of DHCP Discover to the scope B in the DHCP server to the detailed setting data file reception. If there is not a change in the set data, the IP phone transmits a connection request to the main apparatus in the VLAN.

Figure 7:
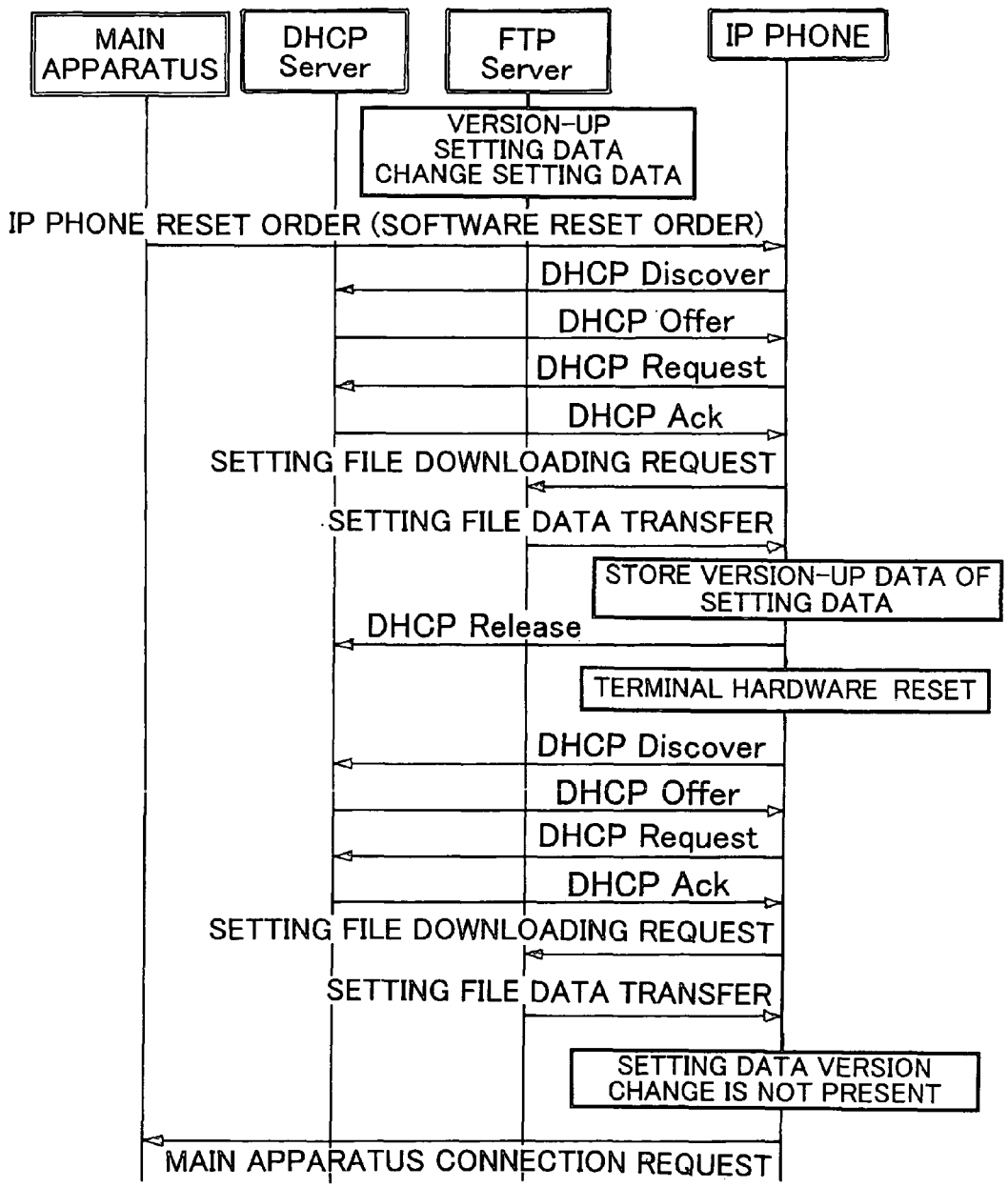
FIG. 7 is a sequence diagram of a setting change conducted while an IP telephone is operating.

FIG. 7 shows a setting change sequence executed while the IP phone is in operation. If the detailed setting data in the FTP server is changed due to, for example, version upgrade, the main apparatus transmits a reset order to the IP phone, and resets the IP phone in a software manner. Ensuing operation is conducted in the same way as FIG. 5.

Figure 8:
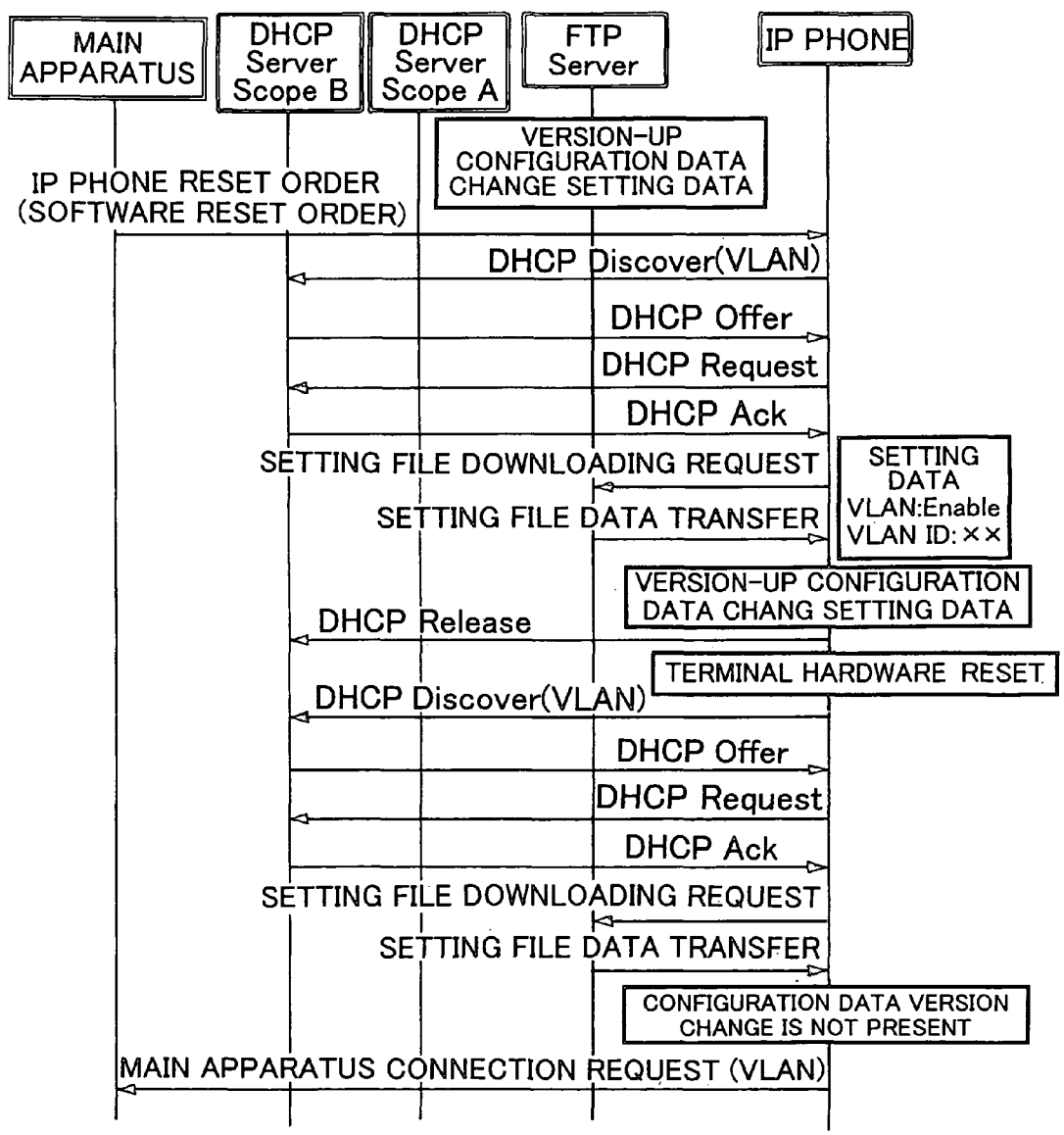
FIG. 8 is a sequence diagram of a setting change conducted while an IP telephone is operating in a VLAN environment.

FIG. 8 shows a setting change sequence executed while the IP phone is operating in the VLAN environment. If the detailed setting data in the FTP server is changed due to version upgrade or the like, the main apparatus transmits a reset order to the IP phone and resets the IP phone in a software manner. The IP phone transmits DHCP Discover to the scope B in the DHCP server. Ensuing operation is the same way as in FIG. 6.

Figure 9:
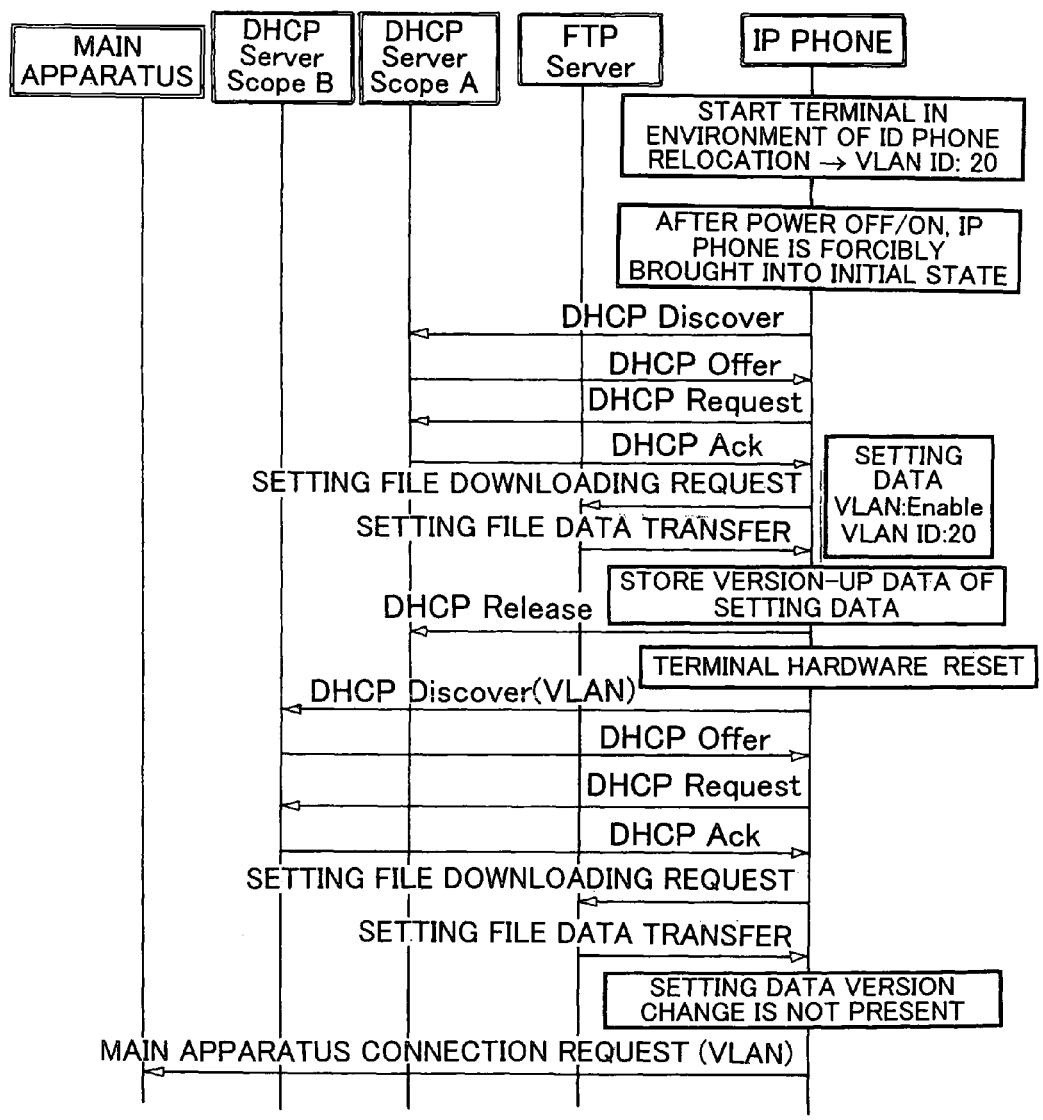
FIG. 9 is a sequence diagram of a setting change conducted when moving an IP telephone.

FIG. 9 shows a setting change sequence executed when moving the IP phone. The case where the IP phone that has been used in "VLAN ID: 10" until then is relocated to another place and the IP phone is set in "VLAN ID: 20" will now be described.

After power is turned on in the IP phone, setting data stored in a flash-ROM is developed onto a RAM to conduct operation. Even if the setting data in the flash-ROM is changed after the start, therefore, the terminal operation is not affected. If the setting data in the flash-ROM is changed to the initial state after the start, therefore, operation is conducted with data obtained before the flash-ROM is rewritten, during the operation. If power is turned off/on due to the relocation, the IP phone operates in the initial state, i.e., in the state of shipping from a factory (Auto Configuration Mode: Enable). Ensuing operation is conducted in the same way as FIG. 6.

Figure 10:
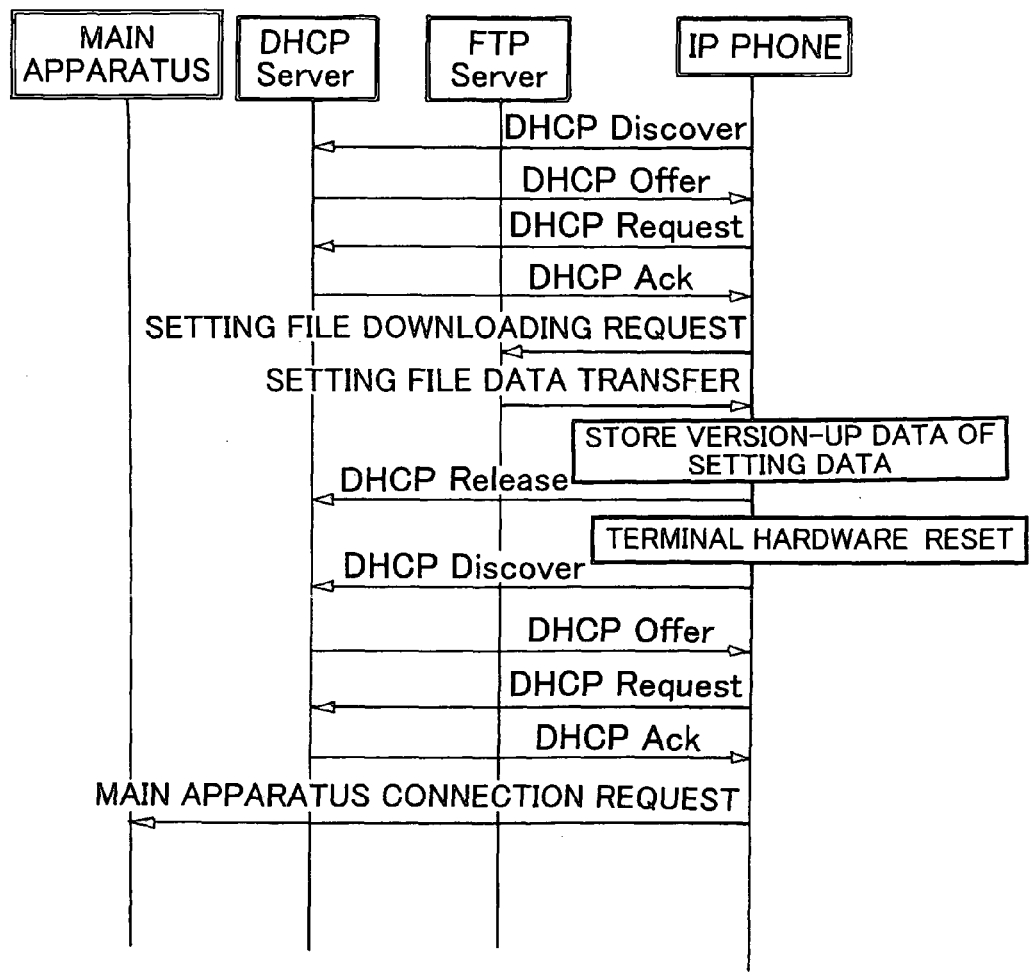
FIG. 10 is a sequence diagram using an auto configuration function only at the time of initial operation.

FIG. 10 shows a sequence executed until the IP phone is connected to the main apparatus by using the auto configuration function only at the time of initial operation of the IP phone. Only at the time of the initial operation, the auto configuration function is used. Thereafter, a PC application is used and "Auto Configuration Mode: Disable" is set in the detailed setting item so as not to use the Auto configuration function. In this case, the detailed setting data of the IP phone are automatically set by using the Auto configuration function at the time of initial operation. Even if power is turned off/on thereafter, the IP phone does not return to the initial state, but it is restarted in the state set at the time of initial operation.

Figure 11:
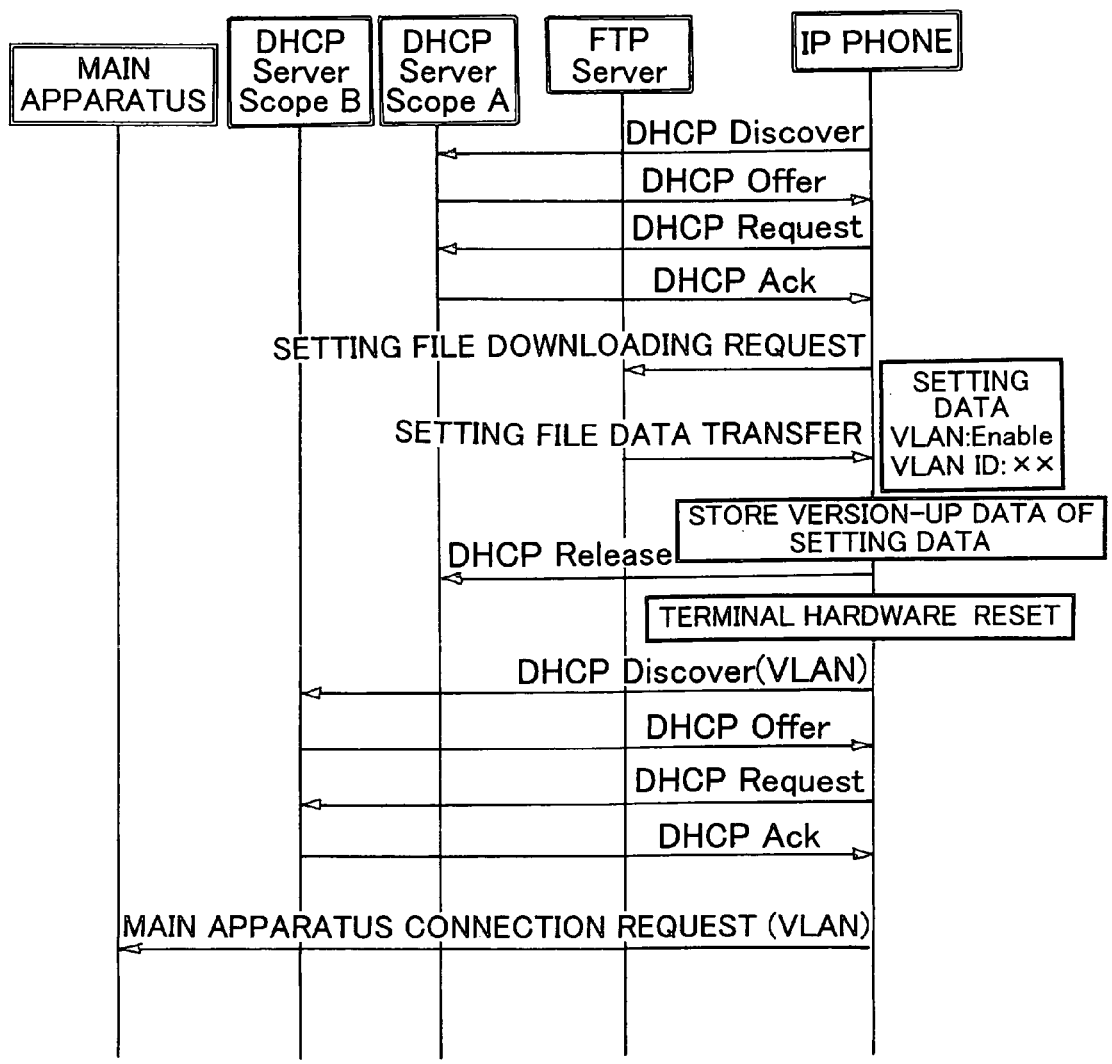
FIG. 11 is a sequence diagram using an auto configuration function only at the time of initial operation in a VLAN environment.

FIG. 11 shows a sequence executed until the IP phone is connected to the main apparatus by using the Auto configuration function in the VLAN environment only at the time of initial operation. The detailed setting data of the IP phone are automatically set in the VLAN environment by using the Auto configuration function at the time of initial operation. Even if the power is turned off/on thereafter, the IP phone does not return to the initial state, but it is restarted in the "VLAN: Enable" state set at the time of the initial operation.

EXAMPLE

Figure 12:
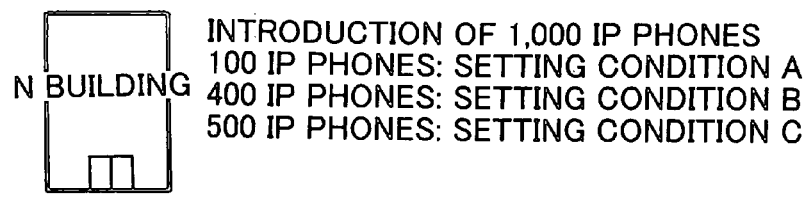
FIG. 12 is a diagram showing an example of application of the present invention to an IP telephone system in a building.

FIG. 12 shows an example of application of the present invention to an IP phone system in a building. It is now supposed that a request to newly introduce 1,000 IP phones into N building has been made. According to the user's order, 100 IP phones among 1,000 IP phones should use the VLAN and should be provided with ID of 20 (setting condition A). As for 400 IP phones, a port number 5434 should be used and the LAN speed should be fixed to 100 M (setting condition B). As for 500 remaining IP phones, the LAN speed should be fixed to 10 M and the duplex should be full (setting condition C). According to the conventional technique, setting must be conducted manually on all IP phones beforehand.

If the IP phone auto configuration system according to the present invention is used, then different detailed setting can be conducted automatically on respective IP phones by only connecting LAN cables to IP phones and connecting the LAN cables to a network having the IP phone auto configuration system.

Figure 13:
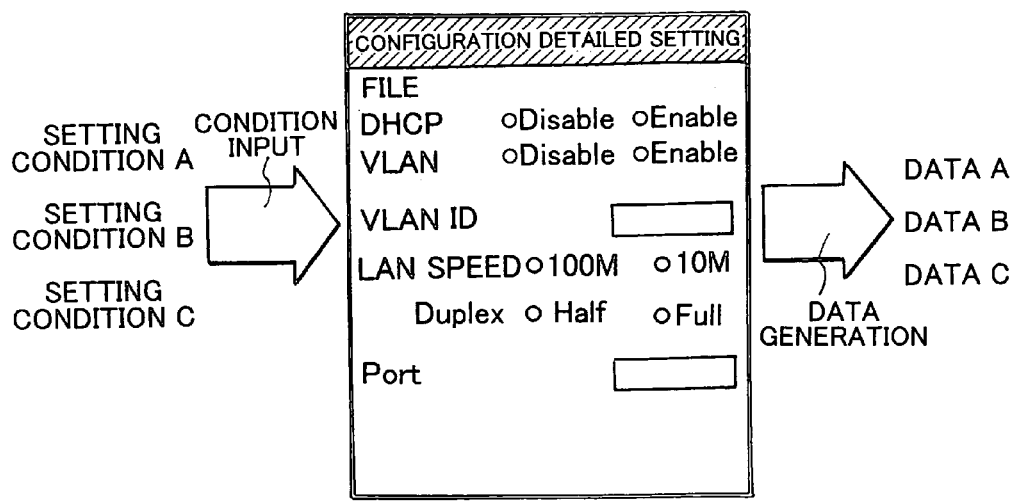
FIG. 13 is a diagram showing a display example of telephone setting application software.

FIG. 13 shows a display example of phone setting application software. First, phone setting application software programmed by using a PC (personal computer) is used. The setting condition A, the setting condition B and the setting condition C are input, and transformed to files as data A, data B and data C.

FIG. 14 shows an example of network connection to which the present invention has been applied. A DHCP server 20, an FTP server 30 and a HUB 60 are connected to a network. First, IP phones are connected to the HUB in order to set the setting data A into 100 IP phones. Each of the connected IP phones acquires an IP address, a sub net mask and an FTP server address. Upon acquiring the FTP server address, the IP phone accesses the FTP server. The FTP server transfers the file generated beforehand by the phone setting application software to the IP phones. In the same way, data B is transferred to 400 IP phones, and data C is transferred to 500 IP phones. If 1,000 IP phones having different setting are connected to the network in the N building, then it is possible to start automatically in a state suitable for the ordered environment.

FIG. 15 is a flow chart in the case where the present invention has been applied to detailed setting in the IP phone system in the building. First, a detailed setting application is started in order to input detailed setting in IP phones (S21). If the application is started, then detailed setting is input (S22) and detailed setting data files are generated (S23). An IP phone in which data should be set is connected to the network in the environment having the DHCP server, the FTP server and the data files (S24). The IP phone acquires an own IP address, a sub net mask and an FTP server address from the DHCP server (S25). The IP phone accesses the FTP server in order to acquire detailed data (S26). The FTP server transfers a data file generated by the detailed setting application to the IP phone (S27). The IP phone receives detailed setting data (S28), and writes the data into the flash-ROM. Thereafter, by connecting the IP phone to a desired network environment (S29), boot-up can be completed (S30).

The present invention can be utilized for initial setting and its change work of an IP device in a system in which an IP device is connected and used in an environment including a DHCP server and an FTP server connected to a network.

What is claimed is:

1. An IP phone auto configuration system comprising:
   IP phones;
   a DHCP server for assigning IP addresses to the IP phones;
   an FTP server for storing at least one setting data file containing auto configuration setting information for the IP phones; and
   a network for connecting the IP phones, the DHCP server and the FTP server,
   wherein each of the IP phones:
   a acquires an address of the FTP server and a first file name of a setting data file corresponding to the IP phone from the DHCP server after being started,
   determines whether there is a difference between the first file name acquired from the DHCP server and a second file name having been retained in the IP phone, and
   acquires the setting data file from the FTP server when there is a difference between the first file name and the second file name, and conducting detailed setting in the IP phone automatically based on the setting data file,
   wherein:
   a range of IP addresses used by the DHCP server is divided into a range using a VLAN and a range that does not use the VLAN, and the setting data file stored in the FTP server contains information indicating whether or not to set a VLAN mode;
   after being started, each of the IP phones acquires IP addresses in the range that does not use the VLAN from the DHCP server as its own IP address and an address of the FTP server; and
   if the setting data file acquired from the FTP server contains information indicating to set the VLAN mode, the IP phone acquires IP addresses in the range that does not use the VLAN as its own IP address and an address of the FTP server again.

2. The IP phone auto configuration system according to claim 1, wherein the setting data file stored in the FTP server includes an item for selecting whether detailed setting is automatically conducted or not in corresponding IP phones.

3. An IP phone auto configuration method in a system including IP phones, a DHCP server for assigning IP addresses to the IP phones, an FTP server for storing at least one setting data file containing auto configuration setting information for the IP phones, and a network for connecting the IP phones, the DHCP server and the FTP server, the IP phone auto configuration method comprising the steps of:
   causing each of the IP phones to acquire an address of the FTP server and a first file name of a setting data file corresponding to the IP phone from the DHCP server after being started; and
   acquiring the setting data file from the FTP server when there is a difference between the first file name and a second file name; and
   automatically conducting detailed setting in the IP phone based on the setting data file, wherein:
   a range of IP addresses used by the DHCP server is divided into a range using a VLAN and a range that does not use the VLAN, and the setting data file stored in the FTP server contains information indicating whether or not to set a VLAN mode;
   after being started, each of the IP phones acquires IP addresses in the range that does not use the VLAN from the DHCP server as its own IP address and an address of the FTP server; and
   if the setting data file acquired from the FTP server contains information indicating to set the VLAN mode, the IP phone acquires IP addresses in the range that does not use the VLAN as its own IP address and an address of the FTP server again.

4. The IP phone auto configuration method according to claim 3, wherein the setting data file stored in the FTP server includes an item for selecting whether detailed setting is automatically conducted or not in corresponding IP phones.

* * * * *

UNITED STATES PATENT AND TRADEMARK OFFICE
CERTIFICATE OF CORRECTION

| | | |
|---|---|---|
| PATENT NO. | : 8,331,350 B2 | Page 1 of 1 |
| APPLICATION NO. | : 11/442269 | |
| DATED | : December 11, 2012 | |
| INVENTOR(S) | : Abe | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1807 days.

Signed and Sealed this
Nineteenth Day of August, 2014

Michelle K. Lee
*Deputy Director of the United States Patent and Trademark Office*